United States Patent [19]

Souza

[11] Patent Number: 4,819,523

[45] Date of Patent: Apr. 11, 1989

[54] LUG NUT WRENCH

[76] Inventor: Alejandro Y. Souza, 2956 Numana Rd., Honolulu, Hi. 96819

[21] Appl. No.: 42,820

[22] Filed: Apr. 27, 1987

[51] Int. Cl.$^4$ .............................................. B25B 23/16
[52] U.S. Cl. ....................................... 81/177.2; 7/100; 81/176.15; 81/465; 81/177.5
[58] Field of Search ..................... 81/177.1, 177.2, 462, 81/465, 466, 177.5, 52, 124.7, 488, 180.1, 176.1, 176.15, 176.2; 7/100, 166, 170; 29/245, 267

[56] References Cited

U.S. PATENT DOCUMENTS

| | | | |
|---|---|---|---|
| 2,300,840 | 11/1942 | Huxel | 7/166 |
| 3,158,050 | 11/1964 | Shandel | 81/466 |
| 3,872,527 | 3/1975 | Tregoning | 29/245 |
| 4,104,935 | 8/1978 | Stoops | 81/177.2 |
| 4,620,462 | 11/1986 | Parker | 81/177.5 |
| 4,644,600 | 2/1987 | Fugate | 81/177.2 X |

FOREIGN PATENT DOCUMENTS 0758321  1/1934  France ............................. 81/176.2

Primary Examiner—James G. Smith
Attorney, Agent, or Firm—James Creighton Wray

[57] ABSTRACT

A lug nut wrench has a half inch driver for receiving a lug nut socket. The driver is connected to one end of a five inch length of half-inch pipe. The other end of the pipe is welded to a one by two by three-eighths inch plate at a position near one end of the plate. One-half inch studs project from an opposite side of the plate. A solid leverage bar has a sharpened end for lifting off hub caps. Radially mounted on the bar, are holes, nuts or rings which fit over the studs. The 18 inch rod is used to increase leverage. Leverage and torque are varied by extending the bar from either the short or long end of the plate.

12 Claims, 3 Drawing Sheets

LUG NUT WRENCH

BACKGROUND OF THE INVENTION

The invention relates to wrenches for tightening or loosening lug nuts on automobile wheels.

A problem exists that nuts are often tightened too tight or subjected to rust, which makes the lugs difficult to loosen, particularly with the same wrench which tightened the lug nuts. Several attempts have been made to change leverages.

U.S. Pat. No. 1,744,413 shows a two-piece socket wrench tool which may be used in different ways to change leverage. A somewhat related wrench handle is shown in U.S. Pat. No. 1,597,747.

U.S. Pat. No. 2,549,910 shows a lug wrench which has several features, among which are a long arm and short arm.

The lug wrench of U.S. Pat. No. 4,416,395 has a torque rod which may be moved to change leverage.

The lug wrench shown in U.S. Pat. No. 4,070,931 was selected to show the ring 29 receiving a part of the wrench which is attached to the socket.

U.S. Pat. No. 3,158,050 is selected to show a plate welded to one end of a pipe which is attached to a lug driver. The plate does not have study for connecting to a lever arm.

U.S. Pat. Nos. 2,486,022 and 1,975,733 are of general interest.

A need exists for a compact lug nut wrench readily adaptable to tighten or loosen nuts with low and high torques respectively.

SUMMARY OF THE INVENTION

A lug nut wrench has a half inch driver for receiving a lug nut socket. The driver is connected to one end of a five inch length of half-inch pipe. The other end of the pipe is welded to a one-sixteenth inch plate at a position nearer one end of the plate. One-half inch studs project from an opposite side of the plate. A leverage rod has a sharpened end for lifting off hub caps. Radially mounted on the bar, are holes, nuts or rings which fit over the studs. The 18 inch rod is used to increase leverage. Leverage and torque are varied by extending the bar from varied positions with respect to the plate.

A preferred lug nut wrench has a plate approximately one-sixteenth inch thick. A pipe approximately five inches in length is fixed at one end in perpendicular arrangement to one side of the plate. First and second studs extend from the plate on a second side thereof opposite a first side from which the pipe is extended. The first and second studs are positioned near first and second longitudinal ends of the plate. The pipe terminates outwardly opposite the plate in a driving means for driving a lug nut receiving socket. A leverage bar about 18 inches in length has a first proximal end tapered to an edge for removing a hub cap cover. A handle is formed at one end. A first stud receiving opening near one end receives a first lug. Second stud receiving openings spaced along the leverage bar from the first opening toward the handle are positioned for receiving the studs. The leverage bar may be connected to the leverage plate with the openings in the leverage bar receiving the studs mounted on the plate for turning the plate, the pipe and a lug nut receiving socket attached to the pipe in a tightening direction when a leverage bar is connected to the second side of the plate with the openings receiving the studs. The leverage bar, plate, pipe and lug nut receiving socket attached to the pipe may be turned in a lug nut loosening direction when the leverage bar is reversed and is connected to the studs on a second side of the plate with the opening near the end of the leverage bar receiving a stud. In the second loosening position of the leverage bar, the handle is positioned at a greater distance from the pipe than when the leverage bar is in the first tightening position.

In a preferred embodiment, the leverage bar is a long pipe squeezed together at opposite ends, with two openings near a middle and one opening in a flattened end.

The leverage bar is a flat bar, and faces of the leverage bar are flat faces, and the openings extend through the leverage bar.

Preferably, the openings are round openings centered in the leverage bar.

In one embodiment, the openings extend from near a center of the bar and open oppositely into upper and lower edges of the bar.

In another embodiment, openings comprise rings welded externally on edges of the bar.

The rings are mounted respectively on opposite upper and lower edges of the bar.

In one embodiment, the studs extend through the plate and in a direction from the plate parallel to the pipe whereby the first opening may be placed on the extended first stud with an edge portion of the bar bearing on the pipe to turn the plate, pipe and lug receiving socket attached to the pipe in a loosening direction, and whereby the first opening may be placed on the second extended stud with an edge of the bar resting on the pipe to turn the plate, pipe and lug receiving socket in a tightening direction.

In one embodiment, the studs are of varied size to fit in specific holes on the bar. In that embodiment, a smaller stud extends axially from the pipe and fits in a small opening in the end of the bar.

DETAILED DESCRIPTION OF THE DRAWINGS

Figure 1:
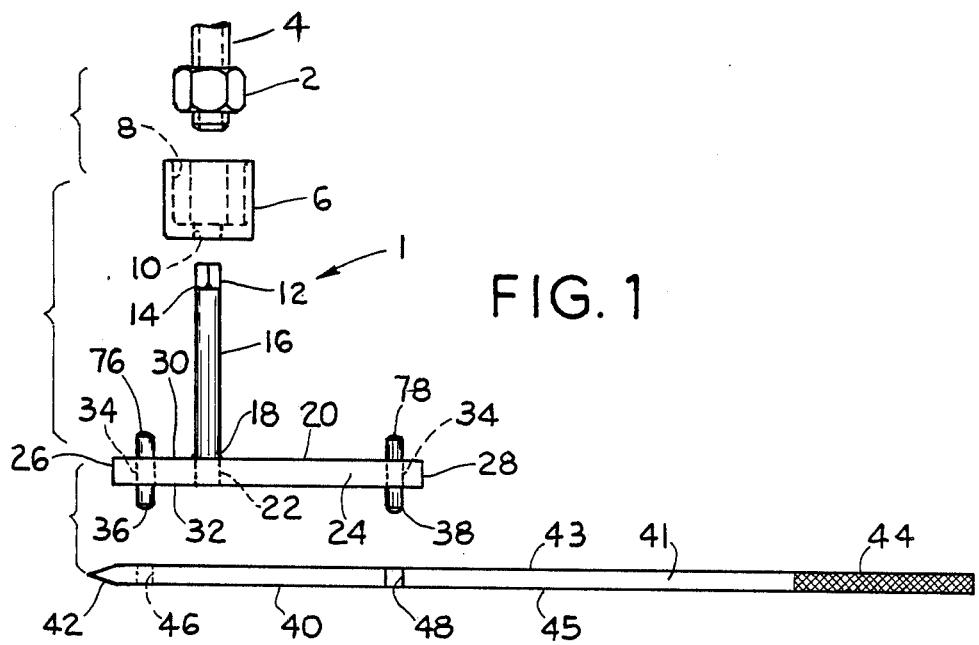
FIG. 1 is a top view of the apparatus of the present invention.

Referring to the drawings, a lug nut wrench is generally indicated by the numeral 1. Wrench 1 removes or tightens a lug nut 2 on a lug 4 to secure a wheel on an axle.

Figure 2:
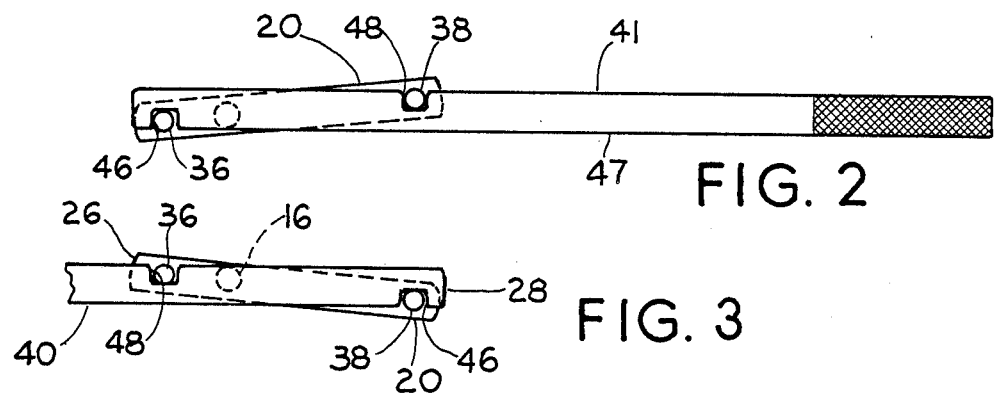
FIG. 2 is a side view of the apparatus of the present invention.

A socket 6 having an appropriately sized receiver 8 for receiving lug nut 2 has a one-half inch driver receiver 10 for receiving a one-half inch driver 12 which is mounted on the distal end 14 of pipe 16. Proximal end 18 of half-inch pipe 16 is welded perpendicularly to plate 20. Pipe 16 may be extended through a hole 22 in plate 20 and held therein by interference fit, by spin welding, by welding, or by any other appropriate means. Pipe 16 and plate 20 are perpendicular. Pipe 16 is approximately five inches in length. Plate 20 has a side edge 24 and a first longitudinal end 26 and a second longitudinal end 28. Plate 20 is approximately eight inches by one inch by one-sixteenth inch. Pipe 16 extends from a first face 30 of plate 20 and studs 36 and 38 extend from a second face 32 opposite to the pipe. Pipe 16 is positioned about two inches from the first longitudinal end 26 and six inches from the second longitudinal end 28 of plate 20. The studs may be press fitted, welded, or spin welded within holes 34 near opposite longitudinal ends of plate 20. First lug 36 extends from side face 32 of plate 20 near the first end 26. Second lug 38 extends from face 32 near the second end 28 of plate 20. A leverage arm 40 is made of a flat bar having a side edge 41 and first and second opposite sides 43 and 45. A first longitudinal end 42 of bar 40 is sharpened for removing wheel covers. A second longitudinal end 44 is formed with a handle. Openings 46 and 48 near the first end 42 of the bar receive the studs 36 and 38. As shown in FIG. 2, opening 46 receives stud 36, and opening 48 receives stud 38 when the leverage bar is used to turn the plate 20, pipe 16 and driver 12 in a lug nut loosening direction.

Figure 3:
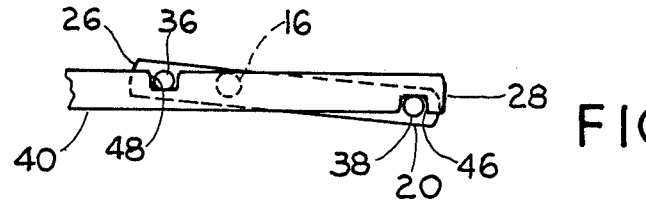
FIG. 3 is a side view of the apparatus showing the leverage bar in the tightening condition.

When it is desired to tighten the lug nuts, lever 40 is reversed as shown in FIG. 3 so that opening 48 receives stud 36, and opening 46 receives stud 38. The result is that less leverage is available for tightening lug nuts 2 than for loosening lug nuts 2.

Figure 4:
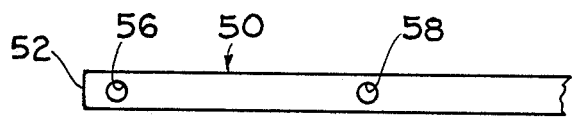
FIG. 4 is a detail of an alternate leverage bar.

As shown in FIG. 4, bar 50 has openings 56 and 58 near the first end 52 for receiving the studs extending from plate 20.

Figure 5:
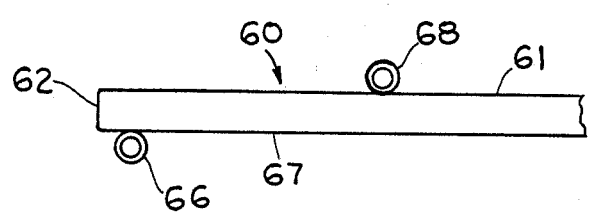
FIG. 5 is a detail of an alternate leverage bar.

Bar 60 in FIG. 5 has rings 66 and 68 mounted near first end 62 for receiving the studs 36 and 38. Ring 68 is mounted on an upper edge 61 of the bar 60, and ring 66 is mounted on a lower edge 67 of the bar 60. The rings preferably are welded to the edges 61 and 67 of the bar.

As shown in FIG. 1, studs 36 and 38 may be extended through openings 34 so that the studs project inward from first face 30 of plate 20 parallel to pipe 16. Any of the bars may be used by connecting any of the openings to one of the extended studs 76 or 78. For example, in loosening a nut, opening 46 may be placed over inward extended studs 76, with a portion of the upper edge 41 of bar 40 resting against pipe 16 as a fulcrum. Alternatively, opening 48 may be placed on stud 78, and a lower edge 47 may be placed against pipe 16 using that lower edge as a fulcrum. In a tightening mode, it is preferably to place opening 48 on stud 76 or opening 46 on stud 78.

In the alternative form shown in FIGS. 4 and 5, opening 56 or 66 may be used in place of opening 46 with stud 76 in the loosening mode or with stud 78 in the tightening mode, or openings 58 or 68 may be used in place of opening 48 with stud 78 in the loosening mode or with stud 76 in the tightening mode.

Figure 8:
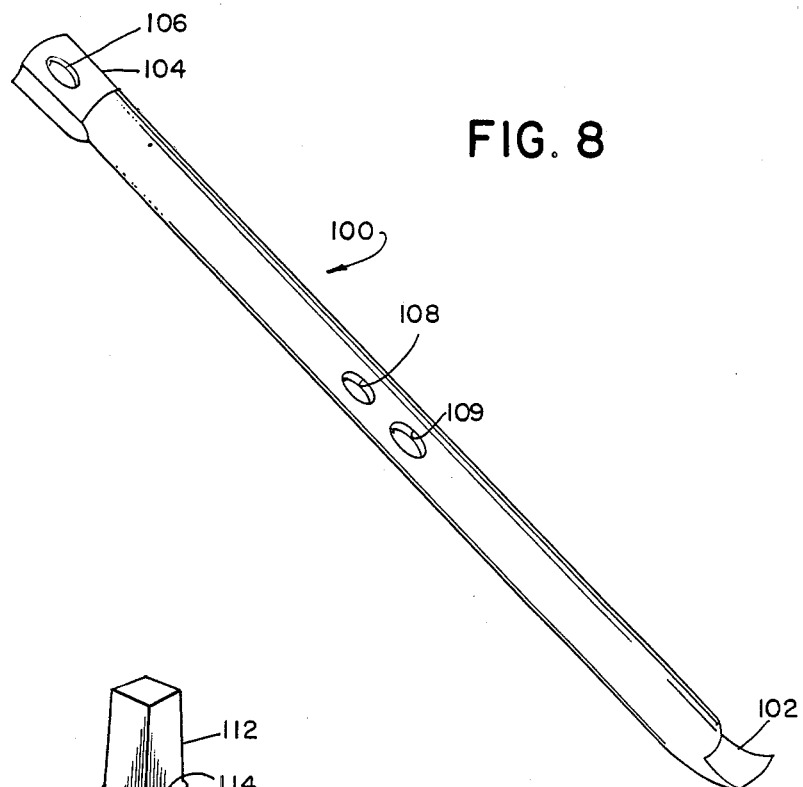
FIG. 8 is a detail of a round hollow bar.

FIG. 8 shows a round hollow bar 100 with opposite ends flattened and welded to form a lifting edge 102 and a stud receiver 104. Hole 106 is sized to receive a small stud as later will be described. Holes 108 and 109 receive small and large studs respectively.

Figure 9:
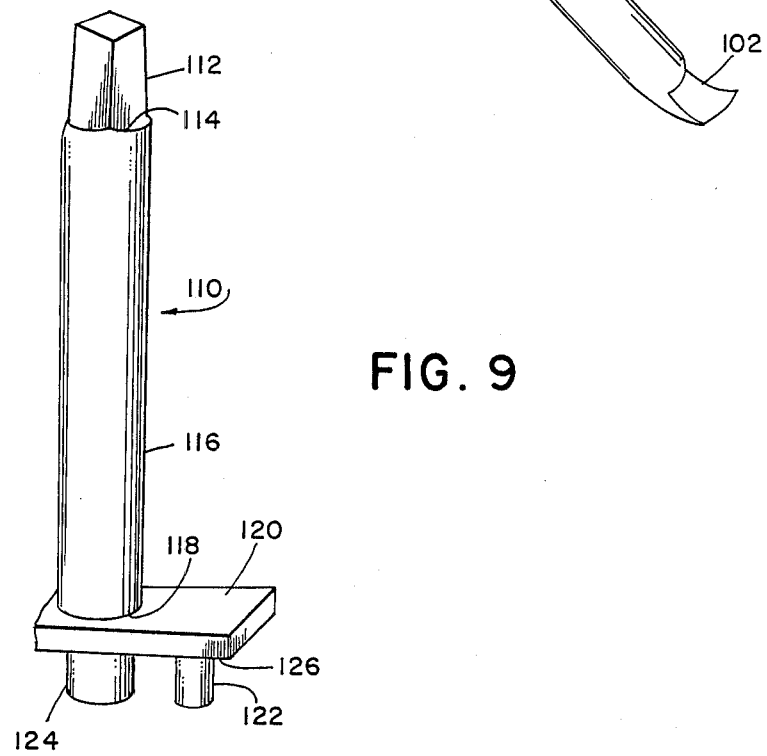
FIG. 9 is a detail of a lug nut driver, pipe, plate and studs welded assembly.

Wrench 110 shown in FIG. 9 has a half-inch socket drive 112 welded at first end 114 of pipe 116. At the second end 118, a plate 120 is welded. Plate 120 has lugs 122 and 124 projecting outward from face 126. Lug 124 is larger in diameter and fits through an opening in plate 120 and is connected to the inside of pipe 116. Lug 122 is smaller in diameter. Lug 124 fits in large hole 109 in bar 100. Small lug 122 fits in hole 108 or hole 106. The latter fit is used to loosen lug nuts, with the edge of stud 124 resting against the edge of stud receiver 104.

Figure 7:
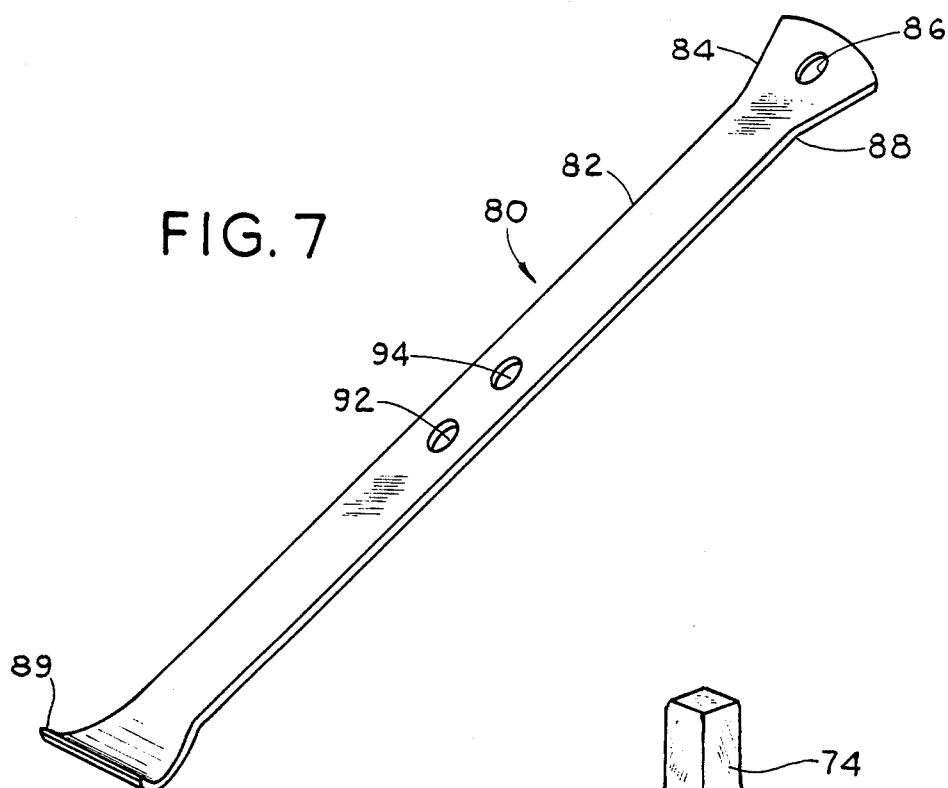
FIG. 7 is a detail of a flat bar.
Figure 6:
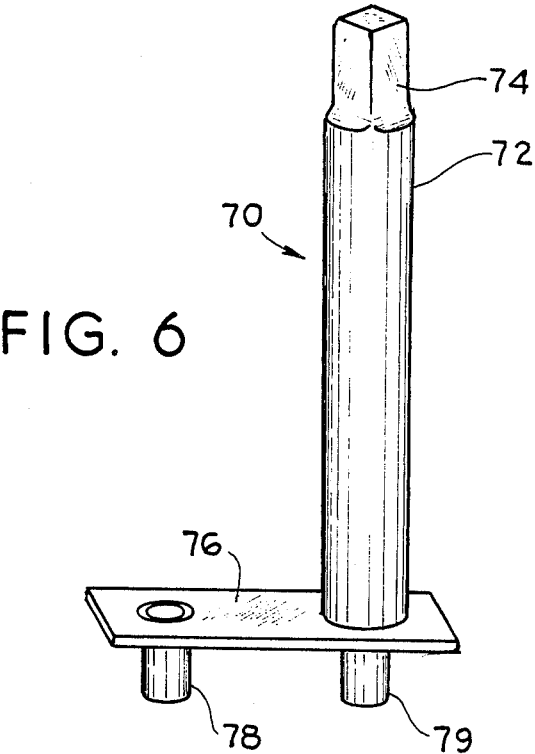
FIG. 6 is a detail of one preferred lug nut socket driver, pipe, stud and plate welded assembly.

FIG. 6 shows a wrench body 70 made of a pipe 72. A square lug nut wrench-mounting driver 74 is welded in one end of pipe 72. The other end of the pipe has a mounting 76 for holding parallel studs 78 and 79. Referring to FIG. 7, a torque bar 80, has a body 82 with a flattened end 84 which has a stud-receiving opening 86 and a side portion 88. One end is flattened 89 to form a wheel cover removing tool. In the center of the bar are stud-receiving openings 92 and 94.

When loosening a lug nut, stud 78 is placed in opening 86 and lever 80 is used to torque a nut loose. When all nuts are loosened, stud 78 is placed in opening 92 and stud 79 is placed in opening 94, and the lever is spun to remove nuts. The nuts are replaced with the wrench.

While the invention has been disclosed with reference to specific embodiments, modifications and variations of the invention may be made without departing from the scope of the invention, which is defined in the following claims.

I claim:

1. Lug nut wrench apparatus having a plate approximately eight inches by one inch by one-sixteenth inch, a pipe approximately five inches in length fixed at one end in perpendicular arrangement to the plate at a position about two inches from a longitudinal end of the plate and six inches from a second longitudinal end of the plate, first and second studs extending from the plate on a second side thereof opposite a first side from which the pipe is extended, the first and second studs being positioned near first and second longitudinal ends of the plate, the pipe terminating outwardly opposite the plate in a driving means for driving a lug nut receiving socket, a leverage bar about 18 inches in length and having a first proximal end tapered to an edge for removing a hub cap cover and having a second distal end and handle means at the second distal end and having a first stud receiving opening near the first proximal end for receiving the first stud and having a second stud receiving opening spaced along the leverage bar from the first opening toward the handle and positioned for receiving the second stud whereby the leverage bar may be connected to the leverage plate with the openings in the leverage bar receiving the studs mounted on the plate for turning the plate, the pipe and a lug nut receiving socket attached to the pipe in a tightening direction when a first side of the leverage bar is adjacent the second side of the plate with first opening receiving the first stud and the second opening receiving the second stud and whereby the leverage bar, plate, pipe and lug nut receiving socket attached to the pipe may be turned in a lug nut loosening direction when a second side of the leverage bar is adjacent the second side of the plate with the second opening near the end of the leverage bar receiving the first stud and the first opening of the leverage bar receiving the second study, whereby in the second loosening position of the leverage bar, the handle is positioned at a greater distance from the pipe than when the leverage bar is in the first tightening position.

2. The apparatus of claim 1 wherein the leverage bar is a flat bar, and wherein the first and second faces of the leverage bar are flat faces, and wherein the first and second openings extend through the leverage bar.

3. The apparatus of claim 2 wherein the first and second openings are round openings centered in the leverage bar.

4. The apparatus of claim 2 wherein the first and second openings extend from near a center of the bar and open oppositely into upper and lower edges of the bar.

5. The apparatus of claim 3 wherein the first and second openings comprise rings welded externally on edges of the bar.

6. The apparatus of claim 5 wherein the first and second rings are mounted respectively on opposite upper and lower edges of the bar.

7. The apparatus of claim 6 wherein the studs extend through the plate and in a direction from the plate parallel to the pipe whereby the first opening may be placed on the extended first stud with an edge portion of the bar bearing on the pipe to turn the plate, pipe and lug receiving socket attached to the pipe in a loosening direction, and whereby the first opening may be placed on the second extended stud with an edge of the bar resting on the pipe to turn the plate, pipe and lug receiving socket in a tightening direction.

8. A lug not wrench apparatus comprising:
a plate having first and second sides and first and second longitudinal ends and being longer than wider and wider than thick;
a pipe having first and second ends, the first end being fixed in perpendicular arrangement to the first side of the plate at a position closer to the first longitudinal end of the plate and further having a driving means for driving a lug nut receiving socket at the second end of the pipe;
first and second studs which extend from the second side of the plate, the first and second studs being positioned near the first and second longitudinal end, wherein the first stud is positioned near the first longitudinal end and is larger in diameter than the second stud;
a torque bar having first and second flattened ends and three stud receiving openings, the first flattened end being shaped to be a lifting edge for removing a hubcap cover and the second flattened edge having the first stud receiving opening for receiving the second stud, the second and third stud receiving openings are centrally positioned on the torque bar, wherein the second stud receiving opening is nearest the second flattened end of the torque bar and receives the second stud, and the third stud receiving opening is nearest the first flattened end and receives the first stud;
whereby the torque bar, plate, pipe and lug nut receiving socket attached to the pipe may be turned in a lug nut loosening direction by first placing the first stud receiving opening over the second stud and turning the torque bar in a lug nut loosening direction to initially loosen the lug nut, the lug nut is further loosened by removing the torque bar from its first placement and placing the second and third receiving openings over the second stud and first stud, respectively, and turning the lug nut in a loosening direction.

9. The apparatus of claim 8 wherein the leverage bar is a flat bar and wherein the first and second faces of the leverage bar are flat faces and wherein first and second openings extend into the leverage bar.

10. The apparatus of claim 9 wherein the first and second openings are round openings centered in the leverage bar.

11. The apparatus of claim 9 wherein the first and second openings extend from near a center of the bar and open oppositely into upper and lower edges of the bar.

12. The apparatus of claim 8 wherein the leverage bar is a round hollow bar and wherein first and second openings extend into the leverage bar and the third opening extends through the leverage bar.

* * * * *